(12) United States Patent
Endoh

(10) Patent No.: US 8,870,359 B2
(45) Date of Patent: Oct. 28, 2014

(54) CARBON NANOTUBE INK COMPOSITION

(75) Inventor: Hiroyuki Endoh, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 13/388,226

(22) PCT Filed: Jun. 18, 2010

(86) PCT No.: PCT/JP2010/004090
§ 371 (c)(1),
(2), (4) Date: Jan. 31, 2012

(87) PCT Pub. No.: WO2011/016172
PCT Pub. Date: Feb. 10, 2011

(65) Prior Publication Data
US 2012/0127236 A1 May 24, 2012

(30) Foreign Application Priority Data
Aug. 3, 2009 (JP) ................. 2009-180834

(51) Int. Cl.
*C09D 11/00* (2014.01)
*C09D 11/324* (2014.01)
*C09D 11/38* (2014.01)

(52) U.S. Cl.
CPC ............. *C09D 11/38* (2013.01); *C09D 11/324* (2013.01)
USPC ........................................................ 347/100

(58) Field of Classification Search
USPC ........................................................ 347/100
See application file for complete search history.

(56) References Cited

U.S. PATENT DOCUMENTS

| | | | |
|---|---|---|---|
| 5,968,244 A | 10/1999 | Ueda et al. | |
| 6,500,248 B1 | 12/2002 | Hayashi | |
| 2007/0069183 A1 | 3/2007 | Sato et al. | |

FOREIGN PATENT DOCUMENTS

| | | | | |
|---|---|---|---|---|
| JP | 10-237366 A | | 9/1998 | |
| JP | 10237366 A | * | 9/1998 | ............. C09D 11/00 |
| JP | 2002-255528 A | | 9/2002 | |
| JP | 2003-038906 A | | 2/2003 | |
| JP | 2006-249399 A | | 9/2006 | |
| JP | 2006249399 A | * | 9/2006 | ............. C08L 53/00 |
| JP | 2008-094894 A | | 4/2008 | |
| WO | WO 00/22056 A1 | | 4/2000 | |

OTHER PUBLICATIONS

Kumar, S., et al., "Performance of carbon nanotube-dispersed thin-film transistors," Applied Physics Letter, 2006, pp. 143501-1-143501-3, vol. 89.

Martel, R., et al., "Single-and-multi-wall carbon nanotube field-effect transistors," Applied Physics Letters, Oct. 26, 1998, pp. 2447-2449, vol. 73, No. 17.

Saran, Neerja, et al., "Fabrication and Characterization of Thin Films of Single-Walled Carbon Nanotube Bundles on Flexible Plastic Substrates," JACS Communications, 2004, pp. 4462-4463, vol. 126, No. 14.

Tans, Sander J., et al., "Room-temperature transistor based on a single carbon nanotube," Letters to Nature, May 7, 1998, pp. 49-52, vol. 393.

Wind, S.J., et al., "Vertical scaling of carbon nanotube field-effect transistors using to gate electrodes," Applied Physics Letters, May 20, 2002, pp. 3817-3819, vol. 80, No. 20.

Wu, Zhuangchun, et al., "Transparent, Conductive Carbon Nanotube Films," Science, Aug. 27, 2004, pp. 1273-1276, vol. 305.

Xiao, Kai, et al., "High-mobility thin-film transistors based on aligned carbon nanotubes," Applied Physics Letters, Jul. 7, 2003, pp. 150-152, vol. 83, No. 1.

Zhang, Mei, et al., "Strong, Transparent, Multifunctional, Carbon Nanotube Sheets," Science, Aug. 19, 2005, pp. 1215-1219, vol. 309.

Zhou, Yangxin, et al., "A method of printing carbon nanotube thin films," Applied Physics Letters, 2006, pp. 123109-1-123109-3, vol. 88.

* cited by examiner

*Primary Examiner* — Laura Martin
(74) *Attorney, Agent, or Firm* — Sughrue Mion, PLLC

(57) ABSTRACT

A carbon nanotube ink composition that exhibits excellent storage stability and superior printability during printing using a printing device. The carbon nanotube ink composition includes at least carbon nanotubes, a solvent, and an acetylene glycol compound represented by general formula (1) shown below. In general formula (1), m represents an integer of 0 to 5, n represents an integer of 0 to 5, each of $R^1$ to $R^4$ represents a hydrogen atom or a linear or branched hydrocarbon group of 1 to 6 carbon atoms, and each of $R^5$ to $R^8$ represents a hydrogen atom or a methyl group.

[Chemical Formula 1]

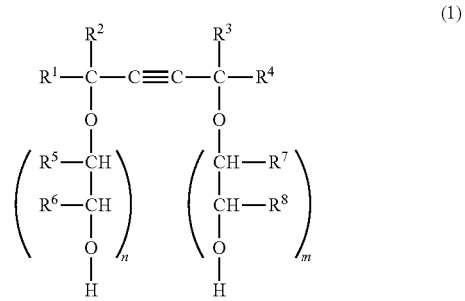

(1)

4 Claims, No Drawings

CARBON NANOTUBE INK COMPOSITION

CROSS REFERENCE TO RELATED APPLICATION

This application is a National Stage of International Application No. PCT/JP2010/004090, filed on Jun. 18, 2010, claiming priority based on Japanese Patent Application No. 2009-180834, filed Aug. 3, 2009, the contents of all of which are incorporated herein by reference in their entirety.

TECHNICAL FIELD

The present invention relates to a carbon nanotube ink composition containing carbon nanotubes dispersed uniformly therein as a dispersoid, and relates particularly to a carbon nanotube ink composition capable of forming an ink that exhibits excellent printability during printing using a printing device.

Priority is claimed on Japanese Patent Application No. 2009-180834, filed Aug. 3, 2009, the content of which is incorporated herein by reference.

BACKGROUND ART

Carbon nanotubes have a circular cylindrical structure composed of a rolled graphene sheet, and generally have a straw-shaped structure.

Further, carbon nanotubes are classified into single walled carbon nanotubes (SWCNT) formed from single layer tubes, double walled carbon nanotubes (DWCNT) having a laminated structure (two-layer structure) composed of two tubes having different diameters, and multi walled carbon nanotubes (MWCNT) having a laminated structure (multi-layer structure) composed of a plurality of tubes having different diameters, and much applied research is being conducted into harnessing the properties of these respective structures.

Among the above types of carbon nanotubes, SWCNT may adopt a structure having semiconductor properties depending on the way in which the graphene sheet is rolled, and because they are expected to exhibit superior mobility, applications of these SWCNT to thin-film transistors (TFT) holds considerable promise, and research into such applications is being actively pursued. For example, Non-Patent Documents 1 to 4 and the like disclose that TFTs using carbon nanotubes exhibit performance that matches or exceeds that of silicon.

In those cases where carbon nanotubes are used as one component of a channel semiconductor material, the TFT is produced by either dispersing one or several carbon nanotubes in the semiconductor material, or dispersing a multitude of carbon nanotubes in the semiconductor material.

In those cases where one or several carbon nanotubes are used, because the length of the carbon nanotubes is generally approximately 1 µm or less, microfabrication techniques are required during production of the TFT, and the so-called channel length between the source electrode and the drain electrode must be produced at the sub-micron level.

In contrast, in those cases where a multitude of carbon nanotubes are used, because a network of the carbon nanotubes is used as the channel, the length of the channel can be increased, and the channel can be produced relatively easily. One example of a method of producing a TFT by dispersing a multitude of carbon nanotubes in a solvent or the like is disclosed in Non-Patent Document 5.

Furthermore, because DWCNT and MWCNT exhibit high levels of electrical conductivity, applications of these types of carbon nanotubes to electrode materials, wiring materials, antistatic films and transparent electrodes holds considerable promise, and research into such applications is progressing.

In order to form a TFT in which a multitude of carbon nanotubes have been uniformly dispersed, the multitude of carbon nanotubes are first dispersed in a solvent or the like to form a dispersion, and this dispersion is then used to form the TFT. For example, Non-Patent Documents 6 to 9 and the like disclose methods of forming thin films composed of carbon nanotubes using this type of dispersion. By forming a thin film composed of carbon nanotubes by using a dispersion containing the carbon nanotubes, not only can elements, devices or product substrates be imparted with flexibility, but by applying the dispersion to hard materials such as glass, or other materials such as natural resins or plastics, flexibility can also be imparted to the overall element, device or product. Moreover, by using this type of dispersion, a typical coating process can be employed, meaning a production method that employs a coating process or printing process can be used to reduce the production costs of the element, device or product.

PRIOR ART DOCUMENTS

Non-Patent Documents

[Non-Patent Document 1] S. J. Tans et al., Nature, vol. 393, page 49, 1998
[Non-Patent Document 2] R. Martel et al., Appl. Phys. Lett., 73, 17, page 2447, 1998
[Non-Patent Document 3] S. Wind et al., Appl. Phys. Lett., 80, 20, page 3817, 2002
[Non-Patent Document 4] K. Xiao et al., Appl. Phys. Lett., 83, 1, page 150, 2003
[Non-Patent Document 5] S. Kumar et al., Appl. Phys. Lett., 89, page 143501, 2006
[Non-Patent Document 6] N. Saran et al., J. Am. Chem. Soc., 126, page 4462, 2004
[Non-Patent Document 7] Z. Wu et al., Science, 305, page 1273, 2004
[Non-Patent Document 8] M. Zhang et al., Science, 309, page 1215, 2005
[Non-Patent Document 9] Y. Zhou et al., Appl. Phys. Lett., 88, page 123109, 2006

DISCLOSURE OF INVENTION

Problems to be Solved by the Invention

However, preparing a carbon nanotube-containing dispersion that exhibits excellent storage stability is extremely difficult, and in order to prepare such a dispersion, it has conventionally been necessary to add an ionic surfactant or a dispersant having a special structure to the dispersion. However, although these surfactants and dispersants improve the storage stability of the dispersion, if an ink produced using this type of dispersion is used for printing, then the printability tends to be poor, and the ink can often have adverse effects on the printing device.

The present invention has been developed in light of the above circumstances, and has an object of providing a carbon nanotube composition that exhibits excellent storage stability and superior printability during printing using a printing device.

Means to Solve the Problems

As a result of intensive investigation aimed at achieving the above object, the inventors of the present invention discovered that by adding a compound having a specific structure to a carbon nanotube ink composition, a carbon nanotube ink composition having excellent storage stability and superior printability could be obtained, and they were therefore able to complete the present invention.

In order to achieve the above object, a carbon nanotube ink composition according to the present invention includes at least carbon nanotubes, a solvent, and an acetylene glycol compound represented by general formula (1) shown below.

[Chemical Formula 1]

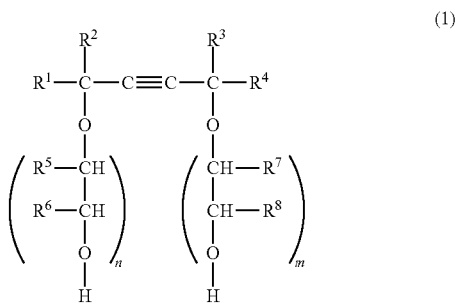

(1)

In general formula (1), m represents an integer of 0 to 5, and n represents an integer of 0 to 5. Each of $R^1$ to $R^4$ represents a hydrogen atom or a linear or branched hydrocarbon group of 1 to 6 carbon atoms, and each of $R^5$ to $R^8$ represents a hydrogen atom or a methyl group.

Effect of the Invention

Because the carbon nanotube ink composition according to the present invention includes at least carbon nanotubes, a solvent, and an acetylene glycol compound represented by general formula (1) shown above, a carbon nanotube ink composition that exhibits excellent dispersion stability of the carbon nanotubes and superior printability can be obtained.

EMBODIMENTS FOR CARRYING OUT THE INVENTION

Embodiments of the carbon nanotube ink composition of the present invention are described below.

These embodiments describe specific examples of the invention in order to facilitate better understanding of the intent of the invention, but unless specifically stated, the embodiments in no way limit the scope of the present invention.

The carbon nanotube ink composition of the present invention includes at least carbon nanotubes, a solvent, and an acetylene glycol compound represented by general formula (1) shown below.

[Chemical Formula 2]

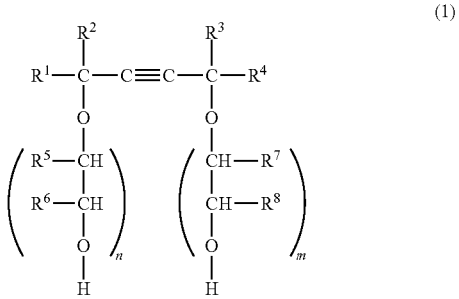

(1)

In general formula (1), m and n may be the same or different, wherein m represents an integer of 0 to 5, and n represents an integer of 0 to 5. Further, in general formula (1), $R^1$, $R^2$, $R^3$ and $R^4$ may be the same or different, and each of $R^1$ to $R^4$ represents a hydrogen atom or a linear or branched hydrocarbon group of 1 to 6 carbon atoms. Furthermore, in general formula (1), $R^5$, $R^6$, $R^7$ and $R^8$ may be the same or different, and each of $R^5$ to $R^8$ represents a hydrogen atom or a methyl group.

The acetylene glycol compound represented by the above general formula (1) is a compound that includes, within the molecule, an acetylene backbone having a triple bond, and a single hydroxyl group or ethylene glycol group on each of the carbon atoms adjacent to the triple bond.

Acetylene glycol compounds are used conventionally as wetting agents for improving the wetting properties of inks, and are used in printing devices, and particularly in devices having inkjet heads, for improving the compatibility between the ink and members within the device, thereby maintaining the stability of the ink inside the inkjet head device, and improving the ink discharge properties from the inkjet head device.

Specific examples of the acetylene glycol compound used in the present invention include 3,4-di(2-hydroxyethoxy)-2,5-dimethyl-3-hexyne, 4,5-di(2-hydroxyethoxy)-3,6-dimethyl-4-octyne, 4,5-di(3-hydroxy-2-butoxy)-3,6-dimethyl-4-octyne, 4,5-di(2-hydroxyethoxy)-2,3,6,7-tetramethyl-4-octyne, 5,6-di(2-hydroxyethoxy)-4,7-dimethyl-5-decyne, and 5,6-di(2-hydroxyethoxy)-4,7-diethyl-5-decyne.

These acetylene glycol compounds can be prepared using the method disclosed in Japanese Unexamined Patent Application, First Publication No. 2003-038906.

The inventors of the present invention discovered that the acetylene glycol compound not only improves the ink discharge properties from the printing device, but also contributes considerably to improving the dispersion stability of the carbon nanotubes in the solvent. In other words, the acetylene glycol compound includes the alkylene structures of the glycol chains and the alkyl structures bonded to the carbon atoms adjacent to the triple bond, and therefore exhibits good affinity with the carbon nanotubes. Further, the acetylene glycol compound also has an ether linkage within the molecule, and depending on the specific structure of the compound, the terminal hydroxyl groups may exhibit a large dipole moment, and therefore the compound also exhibits good affinity with the solvent. In this manner, because the acetylene glycol compound includes, within the one molecule, sites (structures) that exhibit affinity with the carbon nanotubes and sites (structures) that exhibit affinity with the solvent, a favorable state of dispersion for the carbon nanotubes within the solvent can be maintained.

In the carbon nanotube ink composition of the present invention, the acetylene glycol compound represented by general formula (1) can improve the printability described above and ensure favorable dispersion stability for the carbon nanotubes. However, as the number of carbon atoms within the main chain of this acetylene glycol compound increases, and the length of the alkyl groups represented by $R^1$ to $R^4$ increases, although the dispersion stability of the carbon nanotubes improves, the solubility within the solvent deteriorates, and achieving the targeted printing stability becomes difficult.

Accordingly, $R^1$ to $R^4$ within the acetylene glycol compound are preferably selected from groups within a range from a methyl group of 1 carbon atom through to a hexyl group of 6 carbon atoms, and are more preferably selected from groups within a range from a methyl group of 1 carbon atom through to a butyl group of 4 carbon atoms. If the alkyl groups are not linear structures such as normal alkyl groups, but rather include a branched structure such as an isoalkyl group, then even for the same number of carbon atoms, the solubility of the acetylene glycol compound can be improved.

Further, in general formula (1), in those cases where m and n, which indicate the polymerization degree of the glycol chains, are both 0, the glycol chains (alkylene chains) of the acetylene glycol compound become hydroxyl groups, but even with this acetylene glycol compound, the effects of the present invention can still be obtained. However, because this type of compound tends to suffer from inferior solubility within the solvent, the ink discharge properties from the printing device may deteriorate. Accordingly, in order to obtain a carbon nanotube ink composition that exhibits a combination of good dispersion stability and good printability based on favorable solubility, the values of m and n in general formula (1) are preferably selected from within a range from 1 to 3. Further, the ethylene groups of the glycol chains may include methyl groups (namely, $R^5$ to $R^8$ in general formula (1) may be methyl groups).

In the carbon nanotube ink composition of the present invention, there are no particular limitations on the amount of the acetylene glycol compound, and from a practical viewpoint, this amount may be adjusted appropriately in accordance with the carbon nanotube content. The amount of the acetylene glycol compound is preferably not less than 10 parts by mass and not more than 50 parts by mass, and more preferably not less than 30 parts by mass and not more than 50 parts by mass, per 100 parts by mass of the carbon nanotubes.

If the amount of the acetylene glycol compound is less than 10 parts by mass, then the dispersion stability of the carbon nanotubes may deteriorate, and phenomena such as precipitation, aggregation or sedimentation of the carbon nanotubes may occur, resulting in a deterioration in the printing stability. In contrast, if the amount of the acetylene glycol compound exceeds 50 parts by mass, then the surface tension of the ink may decrease markedly, causing a deterioration in the printing properties from the printing device.

In the carbon nanotube ink composition of the present invention, there are no particular limitations on the size of the carbon nanotubes, and for example, in the case of single walled carbon nanotubes (SWCNT), carbon nanotubes having a diameter of 0.7 nm to 2 nm and a length of 0.5 µm to 2.0 µm can be used favorably, in the case of double walled carbon nanotubes (DWCNT), carbon nanotubes having a diameter of 1.0 nm to 3.0 nm and a length of 0.5 µm to 5.0 µm can be used favorably, and in the case of multi walled carbon nanotubes (MWCNT), carbon nanotubes having an external diameter of 5.0 nm to 40.0 nm, an internal diameter of 0.7 nm to 2 nm, and a length of 1.0 µm to 10.0 µm can be used favorably.

In the carbon nanotube ink composition of the present invention, there are no particular limitations on the amount of the carbon nanotubes, but from a practical viewpoint, the amount of the carbon nanotubes is preferably not less than 0.005% by mass and not more than 10% by mass of the composition, and is more preferably not less than 0.05% by mass and not more than 1% by mass.

If the amount of the carbon nanotubes is less than 0.005% by mass, then forming a thin-film transistor (TFT) using the carbon nanotube ink composition becomes difficult. In contrast, if the amount of the carbon nanotubes exceeds 10% by mass, then the viscosity of the carbon nanotube ink composition itself tends to increase, resulting in a paste-like composition, which tends to cause a deterioration in the ink discharge properties from the inkjet head device.

In the carbon nanotube ink composition of the present invention, either water or an organic solvent may be used as the solvent.

Examples of organic solvents that may be used favorably include dichloroethane, monohydric alcohols such as methanol, ethanol, 2-propanol, butanol and octanol, alcohols belonging to the monocyclic monoterpenes such as α-terpineol, esters such as ethyl acetate, butyl acetate, ethyl lactate, propylene glycol monomethyl ether acetate, propylene glycol monoethyl ether acetate, butyl carbitol acetate and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether, ketones such as acetone, methyl ethyl ketone, methyl isobutyl ketone, acetylacetone and cyclohexanone, aromatic hydrocarbons such as benzene, toluene, xylene and ethylbenzene, and amides such as dimethylformamide, N,N-dimethylacetoacetamide and N-methylpyrrolidone. These solvents may be used individually, or in mixtures containing two or more solvents. Of these organic solvents, from the viewpoints of evaporating at a low boiling point, enabling ready formation of a thin film of carbon nanotubes (CNT), and exhibiting minimal danger in terms of combustion or explosion, dichloroethane is preferable.

Furthermore, the carbon nanotube ink composition of the present invention preferably also contains a polyethylene glycol compound having an alkoxy group of 10 or more carbon atoms as a substituent. By adding this polyethylene glycol compound having an alkoxy group of 10 or more carbon atoms as a substituent, a higher concentration of carbon nanotubes can be dispersed stably within the composition.

The alkoxy group of 10 or more carbon atoms may be either a saturated alkoxy group or an unsaturated alkoxy group, and a high degree of dispersion stability can be obtained with either a linear alkoxy group or a branched alkoxy group. Among the various possibilities, in those cases where the alkoxy group of 10 or more carbon atoms is a saturated linear alkoxy group of 18 to 20 carbon atoms, the resulting polyethylene glycol compound yields particularly superior dispersion stability for the carbon nanotubes.

By adding this polyethylene glycol compound having an alkoxy group of 10 or more carbon atoms as a substituent, the carbon nanotubes can be stably dispersed within the carbon nanotube ink composition of the present invention up to a carbon nanotube concentration of 10% by mass.

In the carbon nanotube ink composition of the present invention, there are no particular limitations on the amount of the polyethylene glycol compound having an alkoxy group of 10 or more carbon atoms as a substituent, and an amount that is substantially equal to the carbon nanotube content in terms of mass ratio enables a high degree of dispersion stability to be maintained for the carbon nanotubes.

The carbon nanotube ink composition of the present invention includes at least carbon nanotubes, a solvent, and an acetylene glycol compound represented by general formula (1) shown above, and therefore the dispersion stability of the carbon nanotubes is excellent, and the wetting properties of the ink composition relative to members within the printing device can be improved effectively, meaning the wetting properties relative to printing devices, and particularly inkjet head devices, improve dramatically, enabling superior printability to be obtained when the ink composition is printed onto a printing surface of a printing medium using a printing device.

Particularly in those cases where a carbon nanotube ink composition is discharged by spraying from an inkjet head device onto a printing surface of a printing medium, if the wetting properties of the ink composition are poor, then loading the ink composition satisfactorily within the interior of the inkjet head device becomes problematic, and achieving stable spraying and discharge of the ink composition becomes difficult. Accordingly, by using the carbon nanotube ink composition of the present invention, not only is loading of the ink composition within the interior of the inkjet head device simplified, but the ink composition can also be discharged by spraying in a stable manner.

EXAMPLES

A more detailed description of the present invention is presented below based on a series of examples and comparative examples, but the present invention is in no way limited by the following examples.

Example 1

In this example 1, a carbon nanotube ink composition 1 was prepared using the procedure described below.

First, 10 mg of single walled carbon nanotubes prepared using the Hipco (High Pressure Carbon Monoxide) method were weighed into a glass container, and 5 mg of a compound represented by chemical formula (2) shown below (and hereinafter referred to as "the compound (2)") was then added to the glass container.

Subsequently, 10 g of water was added to the glass container, and an ultrasound apparatus was used to subject the mixture to ultrasound treatment for one hour, thus completing preparation of a carbon nanotube dispersion (the carbon nanotube ink composition 1).

Immediately following the ultrasound treatment, the carbon nanotube ink composition 1 displayed a uniform black state, and no residue or sediment was visible.

Further, when the carbon nanotube ink composition 1 was left to stand, and subsequently inspected 10 days after the ultrasound treatment, and then 30 days after the ultrasound treatment, no residue or sediment was visible, with the ink composition in a similar state to that observed immediately following the ultrasound treatment.

These evaluation results are shown in Table 1.

The dispersion state of the carbon nanotube ink composition 1 was evaluated against the following three levels.

OO: no residue or sediment
Δ: some residue and/or sediment
x: total precipitation

[Chemical Formula 3]

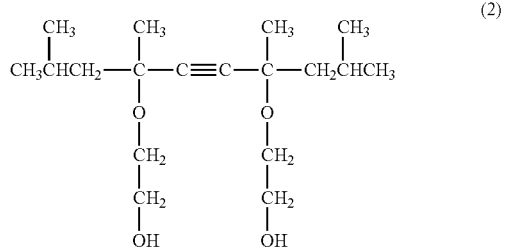

(2)

Further, this carbon nanotube ink composition 1 was loaded into an inkjet head device manufactured by Konica Minolta Holdings, Inc., and the ink composition was then discharged from the inkjet head device and the state of the discharge was observed.

The results confirmed that when the inkjet head device loaded with the carbon nanotube ink composition 1 was operated, in all cases, the ink composition was able to be discharged in a stable manner.

These evaluation results are shown in Table 1.

The discharge state of the carbon nanotube ink composition 1 was evaluated against the following three levels.

OO: stable discharge was achieved
Δ: discharge was possible, but the discharge was unstable
x: discharge was impossible Comparative Example 1

With the exception of not using the compound (2), a carbon nanotube ink composition 101 was prepared in exactly the same manner as Example 1.

In a similar manner to Example 1, the dispersion state of the prepared carbon nanotube ink composition 101 was evaluated immediately after the ultrasound treatment, 10 days after the ultrasound treatment, and then again 30 days after the ultrasound treatment.

The results revealed that, immediately following the ultrasound treatment, although the carbon nanotube ink composition 101 had dispersed to some extent, some slight residue was still visible. When the ink composition was observed 10 days after, and then 30 days after, the ultrasound treatment, it was apparent that all of the carbon nanotubes had precipitated.

Further, the discharge state of the prepared carbon nanotube ink composition 101 from an inkjet head device was also evaluated in the same manner as Example 1.

The results revealed that the ink discharge properties from the inkjet head device were poor, and stable ink droplets were unable to be formed.

These results are shown in Table 1.

Examples 2 to 10

With the exception of using the carbon nanotubes (A), the acetylene glycol compound (B) and the solvent (C) shown in Table 1, carbon nanotube ink compositions 2 to 10 were prepared in exactly the same manner as Example 1.

In a similar manner to Example 1, each of the prepared carbon nanotube ink compositions 2 to 10 was evaluated for dispersion state immediately after the ultrasound treatment, 10 days after the ultrasound treatment and then again 30 days after the ultrasound treatment, and was also evaluated for discharge state of the ink composition from an inkjet head device.

The results are shown in Table 1.

Further, the substituent groups of the acetylene glycol compounds (B) are shown in Table 2.

Comparative Examples 2 to 5

With the exception of using the carbon nanotubes (A) and the solvent (C) shown in Table 1, carbon nanotube ink compositions 102 to 105 were prepared in exactly the same manner as Example 1.

In a similar manner to Example 1, each of the prepared carbon nanotube ink compositions 102 to 105 was evaluated for dispersion state immediately after the ultrasound treatment, 10 days after the ultrasound treatment and then again 30 days after the ultrasound treatment, and was also evaluated for discharge state of the ink composition from an inkjet head device.

The results are shown in Table 1.

Example 11

In this example 11, a carbon nanotube ink composition 11 was prepared using the procedure described below.

First, 100 mg of single walled carbon nanotubes prepared using the Hipco method were weighed into a glass container, and 50 mg of the compound (2) was then added to the glass container.

Moreover, 1 g of a polyethylene glycol (molecular weight: 1,000) having lauryl alkoxy groups ($C_{18}H_{37}O$—) at the terminals was also added to the glass container.

Subsequently, 10 g of water was added to the glass container, and an ultrasound apparatus was used to subject the mixture to ultrasound treatment for one hour, thus completing preparation of the carbon nanotube ink composition 11.

Immediately following the ultrasound treatment, the carbon nanotube ink composition 11 displayed a uniform black state, and no residue or sediment was visible.

Further, when the carbon nanotube ink composition 11 was left to stand, and subsequently inspected 10 days after the ultrasound treatment, and then 30 days after the ultrasound treatment, no residue or sediment was visible, with the ink composition in a similar state to that observed immediately following the ultrasound treatment.

These evaluation results are shown in Table 1.

Further, the carbon nanotube ink composition 11 was loaded into an inkjet head device manufactured by Konica Minolta Holdings, Inc., and the ink composition was then discharged from the inkjet head device and the state of the discharge was observed.

The results confirmed that when the inkjet head device loaded with the carbon nanotube ink composition 11 was operated, the ink composition was able to be discharged in a stable manner.

The evaluation results are shown in Table 1.

Comparative Example 6

With the exception of not using the compound (2), a carbon nanotube ink composition 106 was prepared in exactly the same manner as Example 11.

In a similar manner to Example 11, the dispersion state of the prepared carbon nanotube ink composition 106 was evaluated immediately after the ultrasound treatment, 10 days after the ultrasound treatment, and then again 30 days after the ultrasound treatment.

The results revealed that, immediately following the ultrasound treatment, the carbon nanotube ink composition 106 was dispersed uniformly. However, after standing for 10 days or 30 days, partial precipitation had occurred, indicating that stable dispersibility was unobtainable.

Further, the discharge state of the prepared carbon nanotube ink composition 106 from an inkjet head device was also evaluated in the same manner as Example 11.

The results revealed that the ink discharge properties from the inkjet head device were poor, and stable ink droplets were unable to be formed.

These results are shown in Table 1.

TABLE 1

| Carbon nanotube ink composition | (A) | (B) | (C) | Polyethylene glycol compound | Inkjet head dispersion state | Storage stability evaluations Immediately after preparation | After 10 days | After 30 days |
|---|---|---|---|---|---|---|---|---|
| 1 | SWCNT (Hipco method) | Compound (2) | Water | — | ○○ | ○○ | ○○ | ○○ |
| 2 | SWCNT (Hipco method) | B-1 | Water | — | ○○ | ○○ | ○○ | Δ |
| 3 | SWCNT (Hipco method) | B-2 | Water | — | ○○ | ○○ | ○○ | Δ |
| 4 | SWCNT (Hipco method) | B-3 | Water | — | ○○ | ○○ | ○○ | ○○ |
| 5 | SWCNT (Hipco method) | B-4 | Water | — | ○○ | ○○ | ○○ | ○○ |
| 6 | DWCNT (manufactured by Wako Pure Chemical Industries, Ltd. | B-3 | Water | — | ○○ | ○○ | ○○ | ○○ |
| 7 | MWCNT (manufactured by Wako Pure Chemical Industries, Ltd. | B-3 | Water | — | ○○ | ○○ | ○○ | Δ |
| 8 | SWCNT (Hipco method) | B-5 | dichloroethane | — | ○○ | ○○ | ○○ | Δ |
| 9 | SWCNT (Hipco method) | B-6 | dichloroethane | — | ○○ | ○○ | ○○ | ○○ |
| 10 | SWCNT (Hipco method) | B-7 | dichloroethane | — | ○○ | ○○ | ○○ | Δ |
| 11 | SWCNT (Hipco method) | Compound (2) | Water | ○ | ○○ | ○○ | ○○ | ○○ |
| 101 | SWCNT (Hipco method) | — | Water | — | Δ | Δ | x | x |
| 102 | DWCNT (manufactured by Wako Pure Chemical Industries, Ltd. | — | Water | — | x | x | x | x |
| 103 | DWCNT (manufactured by Wako Pure Chemical Industries, Ltd. | — | dichloroethane | — | Δ | ○○ | Δ | x |
| 104 | MWCNT (manufactured by Wako Pure Chemical Industries, Ltd. | — | Water | — | x | x | x | x |
| 105 | MWCNT (manufactured by Wako Pure Chemical Industries, Ltd. | — | dichloroethane | — | Δ | ○○ | Δ | x |
| 106 | SWCNT (Hipco method) | — | Water | ○ | Δ | ○○ | Δ | Δ |

TABLE 2

| Compound B | R¹ | R² | R³ | R⁴ | R⁵ | R⁶ | R⁷ | R⁸ | m | n |
|---|---|---|---|---|---|---|---|---|---|---|
| B-1 | $CH_3$ | | $C_2H_5$ | | | | | H | 1 | 1 |
| B-2 | $CH_3$ | | $C_2H_5$ | | | | | $CH_3$ | 1 | 1 |
| B-3 | $CH_3$ | | $CH(CH_3)_2$ | | | | | H | 1 | 1 |
| B-4 | $C_2H_5$ | | $CH_2CH(CH_3)_2$ | | | | | H | 1 | 1 |
| B-5 | $CH_3$ | | $CH(CH_3)_2$ | | | | | $CH_3$ | 1 | 1 |
| B-6 | $CH_3$ | | $CH_2CH(CH_3)_2$ | | | | | H | 3 | 3 |
| B-7 | $CH_3$ | | $CH_2CH(CH_3)_2$ | | | | | H | 4 | 4 |

Although the present invention has been described above on the basis of preferred embodiments, the carbon nanotube ink composition according to the present invention is not limited to the configurations described for the above embodiments, and carbon nanotube ink compositions that have undergone various modifications or alterations from the configurations of the above embodiments are also included within the scope of the present invention.

INDUSTRIAL APPLICABILITY

The carbon nanotube ink composition according to the present invention exhibits excellent dispersion stability of the carbon nanotubes and superior printability, and is therefore extremely useful industrially.

The invention claimed is:

1. A carbon nanotube ink composition, comprising at least carbon nanotubes, a solvent, and an acetylene glycol compound represented by general formula (1) shown below:

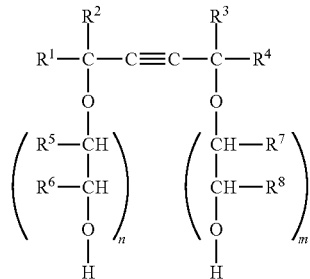

wherein m represents an integer of 0 to 5, n represents an integer of 0 to 5, each of $R^1$ to $R^4$ represents a hydrogen atom or a linear or branched hydrocarbon group of 1 to 6 carbon atoms, and each of $R^5$ to $R^8$ represents a hydrogen atom or a methyl group, and further comprising a polyethylene glycol compound having an alkoxy group of 10 or more carbon atoms as a substituent.

2. The carbon nanotube ink composition according to claim 1, wherein the solvent is water.

3. The carbon nanotube ink composition according to claim 1, wherein the solvent is an organic solvent.

4. A method of spraying a carbon nanotube ink composition, the method comprising spraying the carbon nanotube ink composition according to claim 1 from an inkjet head device onto a printing surface of a printing medium.

* * * * *